United States Patent
Bedingfield, Sr.

(10) Patent No.: US 8,990,678 B2
(45) Date of Patent: Mar. 24, 2015

(54) SYSTEMS AND METHODS FOR AUTOMATICALLY PROVIDING ALERTS OF WEB SITE CONTENT UPDATES

(75) Inventor: James C. Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 10/961,870

(22) Filed: Oct. 8, 2004

(65) Prior Publication Data
US 2005/0050460 A1    Mar. 3, 2005

Related U.S. Application Data

(63) Continuation-in-part of application No. 09/817,944, filed on Mar. 27, 2001.

(51) Int. Cl.
G06F 17/00    (2006.01)
G06F 17/30    (2006.01)

(52) U.S. Cl.
CPC ...... *G06F 17/3089* (2013.01); *G06F 17/30867* (2013.01)
USPC ................................. 715/234; 707/E17.116

(58) Field of Classification Search
CPC ........... G06F 17/3089; G06F 17/30867; Y10S 707/99954
USPC ............................ 715/500, 234; 707/E17.116
See application file for complete search history.

(56) References Cited

U.S. PATENT DOCUMENTS

| | | | | |
|---|---|---|---|---|
| 5,806,078 A | * | 9/1998 | Hug et al. | 715/205 |
| 5,898,836 A | * | 4/1999 | Freivald et al. | 709/218 |
| 5,937,160 A | * | 8/1999 | Davis et al. | 709/203 |
| 5,978,842 A | * | 11/1999 | Noble et al. | 709/218 |
| 5,983,268 A | * | 11/1999 | Freivald et al. | 709/218 |
| 6,009,441 A | * | 12/1999 | Mathieu et al. | 715/236 |
| 6,012,087 A | * | 1/2000 | Freivald et al. | 709/218 |
| 6,076,109 A | | 6/2000 | Kikinis | |
| 6,094,681 A | * | 7/2000 | Shaffer et al. | 709/224 |
| 6,219,818 B1 | * | 4/2001 | Freivald et al. | 714/799 |
| 6,243,757 B1 | * | 6/2001 | Kanodia et al. | 709/235 |
| 6,272,532 B1 | | 8/2001 | Feinleib | |
| 6,356,903 B1 | | 3/2002 | Baxter et al. | |
| 6,405,245 B1 | * | 6/2002 | Burson et al. | 709/217 |
| 6,434,745 B1 | * | 8/2002 | Conley et al. | 717/177 |
| 6,442,594 B1 | | 8/2002 | Ouchi | |

(Continued)

FOREIGN PATENT DOCUMENTS

JP    2002073455 A    *    3/2002    ............. G06F 13/00

OTHER PUBLICATIONS

Challenger et al., "Efficiently Serving Dynamic Data at Highly Accessed Web Sites", Apr. 2004, IEEE Press, pp-233-246.*

(Continued)

*Primary Examiner* — Laurie Ries
*Assistant Examiner* — Benjamin J Smith
(74) *Attorney, Agent, or Firm* — Akerman LLP; Michael K. Dixon; Roy P. Zachariah

(57) ABSTRACT

Methods of automatically updating content on a web site, allowing web site visitors to request notification of updates to the content of a web site, and notifying persons of updated content on a web site are disclosed. Update alert tables and systems for implementing the foregoing methods also are disclosed.

19 Claims, 5 Drawing Sheets

(56) References Cited

U.S. PATENT DOCUMENTS

| | | | |
|---|---|---|---|
| 6,456,308 B1* | 9/2002 | Agranat et al. | 715/854 |
| 6,633,910 B1* | 10/2003 | Rajan et al. | 709/224 |
| 6,636,247 B1 | 10/2003 | Hamzy et al. | |
| 6,735,615 B1* | 5/2004 | Iwayama et al. | 709/204 |
| 6,785,864 B1* | 8/2004 | Te et al. | 715/205 |
| 6,823,357 B1* | 11/2004 | Du et al. | 709/203 |
| 6,834,306 B1* | 12/2004 | Tsimelzon | 709/228 |
| 6,910,071 B2* | 6/2005 | Quintero et al. | 709/224 |
| 6,944,658 B1* | 9/2005 | Schneider | 709/224 |
| 7,058,691 B1* | 6/2006 | Yu et al. | 709/207 |
| 7,177,881 B2* | 2/2007 | Schwesig et al. | 1/1 |
| 7,284,035 B2* | 10/2007 | Yu et al. | 709/207 |
| 7,327,834 B1 | 2/2008 | Hiers et al. | |
| 7,370,315 B1* | 5/2008 | Lovell et al. | 717/100 |
| 7,421,454 B2* | 9/2008 | DeShan et al. | 1/1 |
| 7,426,687 B1* | 9/2008 | Schultz et al. | 715/208 |
| 7,433,876 B2* | 10/2008 | Spivack et al. | 1/1 |
| 7,487,441 B2* | 2/2009 | Szeto | 715/234 |
| 7,599,938 B1* | 10/2009 | Harrison, Jr. | 705/7.29 |
| 7,634,535 B2* | 12/2009 | Watson | 709/203 |
| 7,797,306 B1* | 9/2010 | Pather et al. | 707/714 |
| 7,810,027 B2* | 10/2010 | Bendik | 715/255 |
| 7,823,057 B1* | 10/2010 | Schultz et al. | 715/229 |
| 8,020,106 B2* | 9/2011 | Diab et al. | 715/760 |
| 2002/0013825 A1* | 1/2002 | Freivald et al. | 709/218 |
| 2002/0184359 A1 | 12/2002 | Kaneko et al. | |
| 2003/0028608 A1* | 2/2003 | Patterson | 709/207 |
| 2003/0079041 A1* | 4/2003 | Parrella et al. | 709/247 |
| 2004/0019499 A1* | 1/2004 | Murashita | 705/1 |
| 2004/0068481 A1* | 4/2004 | Seshadri et al. | 707/1 |
| 2004/0199871 A1* | 10/2004 | Lee | 715/513 |
| 2004/0205604 A1* | 10/2004 | Read | 715/517 |
| 2005/0010635 A1* | 1/2005 | Schwesig et al. | 709/203 |
| 2005/0086384 A1* | 4/2005 | Ernst | 709/248 |
| 2005/0108363 A1* | 5/2005 | Torigoe et al. | 709/218 |
| 2005/0193010 A1* | 9/2005 | DeShan et al. | 707/104.1 |
| 2005/0216439 A1* | 9/2005 | Kawakita | 707/1 |
| 2006/0004703 A1* | 1/2006 | Spivack et al. | 707/2 |
| 2006/0026304 A1* | 2/2006 | Price | 710/8 |
| 2006/0230021 A1* | 10/2006 | Diab et al. | 707/3 |
| 2007/0233748 A1* | 10/2007 | Chang et al. | 707/200 |
| 2007/0250767 A1* | 10/2007 | Wisniewski | 715/513 |
| 2008/0028300 A1* | 1/2008 | Krieger et al. | 715/255 |

OTHER PUBLICATIONS

Osborn, james, "Using Webpages to make Your Life Easier", ACM, 2001, pp. 123-128.*

Waldman et al.,"The Architecture of Robust Publishing Systems" ACM, 2001, pp. 199-230.*

Aycock et al.,"An Architecture for Easy Web Page Updating", ACM, 1999, pp. 1-10.*

Bunch et al.,"Software Agents for Process Monitoring and Notification", ACM, 2004, pp. 94-99.*

Kellar et al.,"An Exploration of Web-based Montoring: Implications for Design", ACM, 2007, pp. 377-386.*

Ben Hammersley; "Content Syndication with RSS"; Pub. Date: Mar. 24, 2003; Print ISBN-13: 978-0-596-00383-8.*

Bedingfield; U.S. Appl. No. 09/817,944, filed Mar. 27, 2001.

Bedingfield; Non-Final Rejection mailed May 19, 2004 for U.S. Appl. No. 09/817,944, filed Mar. 27, 2001.

Bedingfield; Final Rejection mailed Jun. 15, 2006 for U.S. Appl. No. 09/817,944, filed Mar. 27, 2001.

Bedingfield; Final Rejection mailed May 3, 2007 U.S. Appl. No. 09/817,944, filed Mar. 27, 2001.

Bedingfield; Non-Final Rejection mailed Oct. 30, 2007 for U.S. Appl. No. 09/817,944, filed Mar. 27, 2001.

Bedingfield; Examiner Interview Summary mailed Jan. 28, 2008 for U.S. Appl. No. 09/817,944, filed Mar. 27, 2001.

Bedingfield; Final Rejection mailed Apr. 14, 2008 for U.S. Appl. No. 09/817,944, filed Mar. 27, 2001.

* cited by examiner

110

| WEB PAGE URL | UPDATE ALERT RECIPIENTS |
|---|---|
| http://www.obay.com/84321 | joe@bellsouth.net<br>suzie@bellsouth.net |
| http://xyztimes.com | bill@bellsouth.net |
| bellsouth.com/promos/specialoffers.htm | jim@bellsouth.com<br>steve@bellsouth.net |

Fig. 5

SYSTEMS AND METHODS FOR AUTOMATICALLY PROVIDING ALERTS OF WEB SITE CONTENT UPDATES

CROSS-REFERENCE TO RELATED APPLICATION

This application is a continuation-in-part of U.S. application Ser. No. 09/817,944, entitled "System and method of automatically updating content on a web site," filed Mar. 27, 2001, the entire contents of which are incorporated by reference.

FIELD OF THE INVENTION

The inventions relate to systems and methods for updating content on a web site and providing automatic alerts that content has been updated.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

Web sites today often have numerous pages and contain large amounts of content in the form of graphics, text, links, banner advertising, and the like. Maintaining this content current and up-to-date can therefore become quite demanding. The process of manually accessing and evaluating the content on each page can be both tedious and time-consuming, and therefore easily put aside by web site owners/administrators who are pressed for time and resources. Nonetheless, for many web site owners/administrators (such as a small business owners) maintaining the content on one's web site current can be quite important. Therefore, a method that would automatically access one's web site and present content to the web site owners/administrators for periodic review would encourage the web site owners/administrators to maintain their web sites current while easing the burden of doing so at the same time. Further, once content on a web site is updated, there is a need for an efficient way of alerting or notifying persons or even other computers that updated content is available.

SUMMARY OF THE INVENTION

Illustrative embodiments of systems and methods for alerting persons or other computers that updated web site content is available are shown and described. One such illustrative embodiment is a method for alerting users of updates to web site content that includes the steps of receiving a request from a user to be notified of updates, detecting an update, and sending an alert message notifying the user of an update. The request may include a universal resource locator (URL) of a web page. The request may also include an address to which an alert is to be sent. Another illustrative embodiment is a machine-readable medium with stored data and instructions, which, when executed, receive a request from a user to be notified of an update, detects an update, and sends an alert message notifying the user of an update. A further illustrative embodiment is an apparatus that includes an updating server with updating process and update alerting process modules, an interface to a web hosting server that hosts a web site having content residing on it, and an interface to a user. The updating server receives a request from a user to be notified of an update, detects an update, and sends an alert message notifying the user of an update.

BRIEF DESCRIPTION OF THE DRAWINGS

These and other features, aspects, and advantages of the present embodiment of the invention will become better understood with regard to the following description, appended claims, and accompanying drawings where:

FIG. 5 is an exemplary logical representation of the contents of an update alert table.

DETAILED DESCRIPTION OF ILLUSTRATIVE EMBODIMENTS

Figure 1:
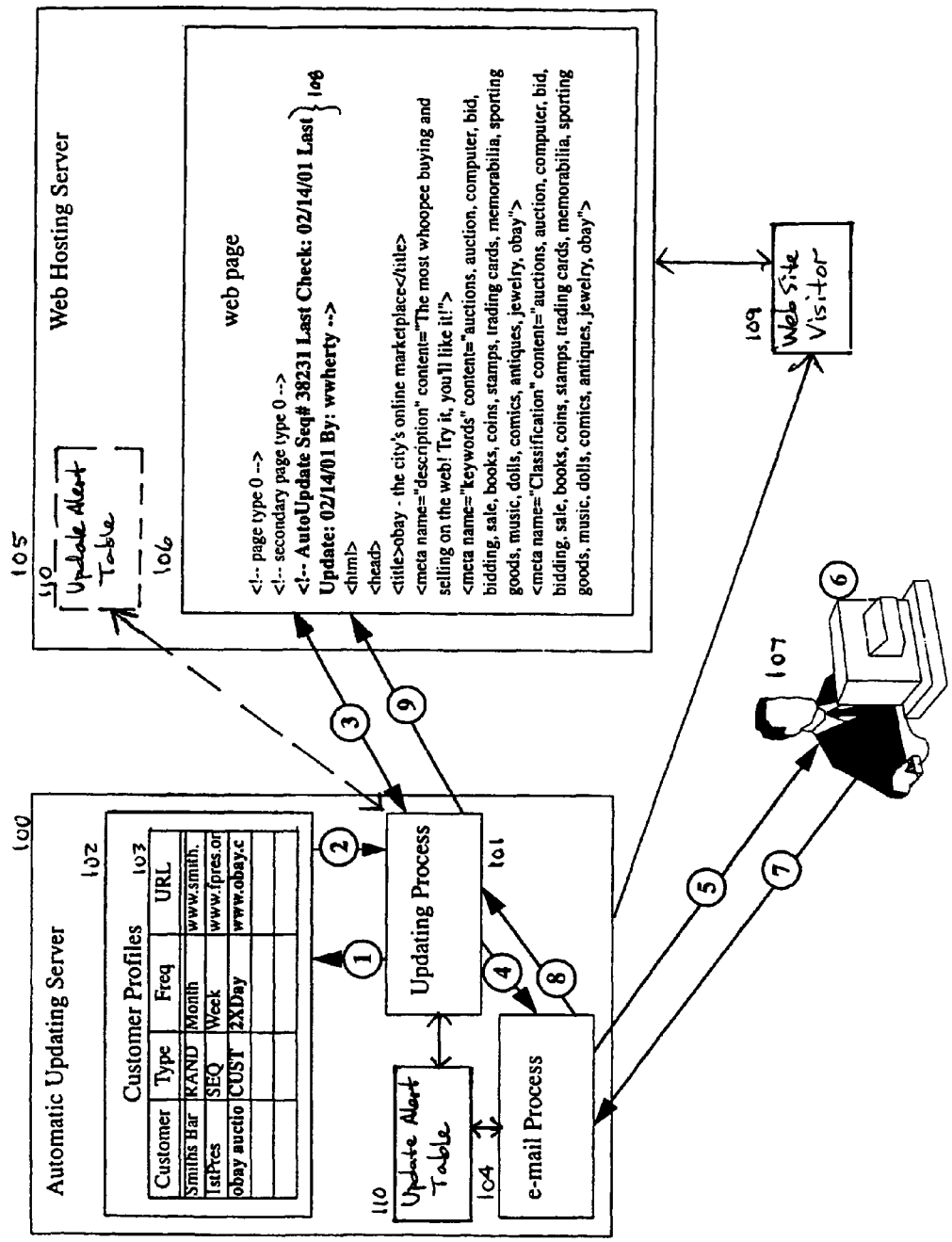
FIG. 1 is a block diagram depicting a computer running executable code in one exemplary embodiment of the invention.

Throughout the following detailed description similar reference numbers refer to similar elements in all the Figs. of the drawings. FIG. 1 is a block diagram depicting a computer 100 running executable code or software 101, 104 in one embodiment of the invention. Computer 100 is a typical server with non-volatile memory 102. Residing in memory 102 are a plurality of programmable update profiles or customer profiles 103. Each customer who wishes to have content 106 on his or her web site automatically updated by server 100 has their own profile or row in the table of customer profiles 103. The fields comprising each update profile are a named party or customer, an update type, an update frequency, a named party uniform resource locator or URL, a named party e-mail address, and the like. The named party field identifies the owner or administrator of a web site. The named party URL identifies the address of the named party's web hosting server 105 on the public or a private internet. The update frequency identifies how often the named party wants updating process 101 to access the named party's web site and select content to be updated. Typical frequencies might be twice daily, daily, weekly, monthly, or the like.

The update type identifies how the named party wants updating process 101 to select content to be updated after updating process 101 accesses the named party's web site. Typical update types might be random (RAND), sequential (SEQ), custom (CUST), and the like. If a named party specifies a random update type, updating process 101 accesses the named party's web site using the named party's URL and randomly selects content from at least one web page 106 on the named party's web hosting server 105. If a named party specifies a sequential update type, updating process 101 accesses the named party's web site using the named party's URL and sequentially selects content from at least one web page 106 on the named party's web hosting server 105. Updating process could sequentially select content from a single web page 106 or sequentially step through multiple pages selecting content from each page 106 when accessed. If a named party specifies a custom update type, updating process 101 accesses the named party's web site using the named party's URL and selects content from at least one web page 106 in a manner specifically set out by the named party when creating or revising his or her update profile. For instance, the named party could specify that content from only certain pages such as the homepage or frequently accessed pages be selected for updating. The named party may also specify that only certain graphics and/or text be selected for updating. Any number of combinations are possible.

Once updating process 101 determines that it is time to access a named party's web site 105 and selects the appropriate content, updating process 101 passes a copy of the selected content and the named party's e-mail address to e-mail process 104. E-mail process 104 creates an e-mail message to the named party informing him or her that it is time to update content on his or her web site, and appends a copy of the selected content to the e-mail message as an attachment or attachments. When the named party 107 receives the e-mail message from e-mail process 104 he or she opens the message and decides whether to update the attached content. If the named party decides to update the content he or she does so by revising the copy of the selected content in the attachment, which includes replacing the attachment with new content, and sending a reply message back to e-mail process 104. If the named party decides not to update the content he or she simply sends a reply message to e-mail process 104 with no changes to the attachment. If the named party does not reply to the e-mail from e-mail process 104, in one embodiment of the invention updating process 101 will ignore the lack of response and continue to generate e-mail messages to the named party in accordance with the named party's update profile 103. In another embodiment of the invention, if the named party fails to reply to the e-mail message from e-mail process 104 updating process 101 will send reminder e-mails to the named party until he or she responds. Whether updating process 101 ignores a lack or response or sends reminder e-mails, and the frequency and/or number of reminder e-mails, may be an option specified in the named party's update profile 103.

Upon receipt of a reply message from named party 107 e-mail process 104 passes the attachment containing the revised copy of the selected content to updating process 101. Upon receipt of the attachment from e-mail process 104 updating process 101 updates the named party's web site 105 and an update log 108 (contained in the remarks section of at least one web page 106 for example) based on the changes to the revised copy of the selected content, if any. Update log 108 contains information such as an automatic update sequence number (AutoUpdate Seq #) field, a last checked date field, a last updated date field, a last updated by field, and the like. E-mail process 104 may constitute any of a number of e-mail packages such as MICROSOFT OUTLOOK, EUDORA, or the like. If e-mail process 104 supports rich text formatting of e-mail messages then updating process 101 can update the formatting of textual content on the named party's web site by mapping the rich text format to hypertext markup language or HTML.

An update alert table 110 may reside on automatic updating server 100 as well in particular embodiments of the inventions. While update alert table 110 may take any number of forms, FIG. 5 is an exemplary logical representation of the contents of an update alert table in one embodiment of the invention. One ordinarily skilled in the art will recognize that, among many other things, additional information could be included in update alert table 110 and that update alert table 110 could reside in places other than automatic updating server 100 itself. For instance, an update alert table particular to the web site or web sites located on a web hosting server (e.g., web hosting server 105) could reside on the web hosting server as well and be accessed by the processes running on automatic updating server 100 as needed by way of a communications or data link. In exemplary update alert table 110, e-mail addresses for update alert recipients associated with a particular web page url are shown. For example, the e-mail addresses joe@bellsouth.net and suzie@bellsouth.net are associated with web page url http://www.obay.com/84321. Additional entries in the table are made as needed or requested. In addition, the means of communicating that content on a web page has been updated to an update alert recipient need not be via e-mail or involve an internet. For instance, an update alert recipient could specify that update alerts be delivered via instant message, page, or the like, and an update alert could be sent via an intranet, instant messaging network, paging network, or the like.

Figure 2:
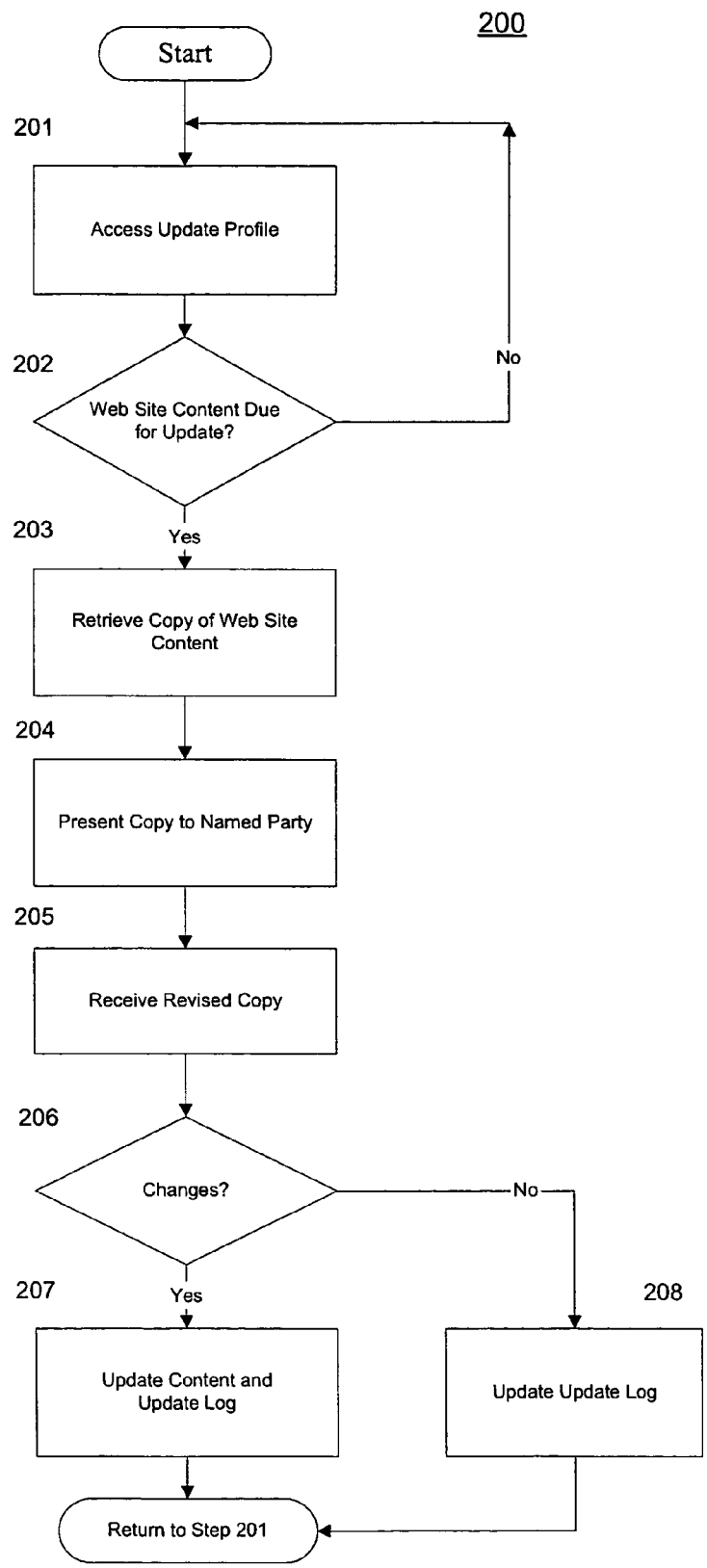
FIG. 2 is a flow chart depicting the steps performed in one exemplary embodiment of the invention.

FIG. 2 is a flow chart depicting the steps in process 200, another embodiment of the invention. In step 201 the process accesses a named party's update profile. In step 202 the process determines whether any content on the named party's web site is due for an update. If no content is due to be updated the process returns to step 201. If content is due to be updated, in step 203 the process 101 retrieves a copy of the web site content to be updated based on the named party's URL. In another embodiment of the invention, the process may retrieve a copy of the web site content to be updated based on the named party's URL and a specified update type. In step 204, the process presents the copy of the web site content to the named party for review. In step 205, the process receives a revised copy of the content from the named party. In another embodiment of the invention, the copy of the web site content is presented to the named party as an attachment to an e-mail message sent to the named party by the process, and the revised copy of the web site content is received from the named party as an attachment to a reply e-mail sent to the process by the named party. In step 206 the process determines whether the revised copy of the content contains any changes to the content on the named party's web site. If there are changes to the content, in step 207 the process updates the content on the named party's web site to reflect the changes. In step 207 the process also updates an update log to reflect changes in an automatic update sequence number, a last checked date field, a last updated date field, a last updated by field, and the like. If no changes to the content are detected in step 206, in step 208 the process updates the update log to reflect changes in only the automatic update sequence number and the last checked date field.

Figure 3:
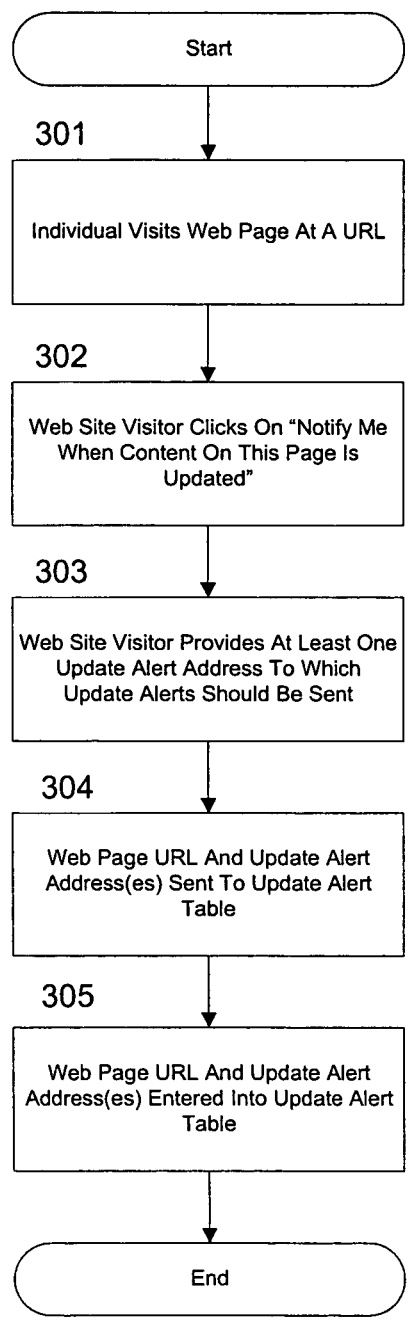
FIG. 3 is a flow chart depicting exemplary steps performed in specifying alert message recipients who desire notification of updated web site content.

FIG. 3 is a flow chart depicting the steps in process 300 in one illustrative embodiment of a particular aspect of the invention. While one of ordinary skill in the art will recognize that there are numerous ways in which an update alert table such as that shown and described in connection with FIG. 5 may be populated and revised, process 300 is one particularly attractive manner of doing so. In step 301 an individual visits a web page located by a url, the web page having a "notify me when content on this page is updated" or other such link thereon. The individual could of course be a natural person, but also could be or include a computer or automated process. In step 302 the web site visitor clicks on the "notify me" or other such link and is presented with a means of providing an update alert address or addresses to which update alerts should be sent. The update alert address may be, for example, an email address, an instant messaging address, a url address, an IP address, or any other type of address that a message or alert could be directed to. In step 303, the web site visitor provides at least one update alert address. In step 304 the update alert address(es) provided and associated web page url are sent to the location where the update alert table for the particular web site or page resides or is to be built. Finally, in step 305 the update alert address(es) and associated web page url are entered into the update alert table.

Figure 4:
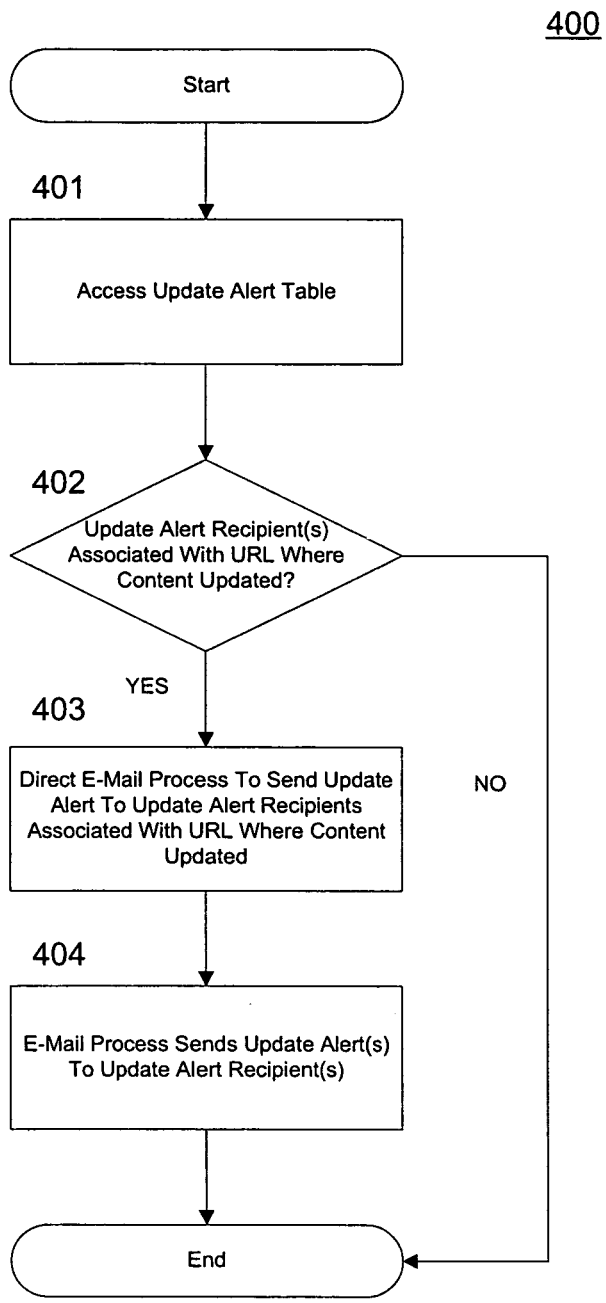
FIG. 4 is a flow chart depicting exemplary steps performed in processing an alert message to notify recipients of the availability of updated web site content.

FIG. 4 is a flow chart depicting the steps in process 400, which is but one of the many possible embodiments of implementing the update alert communication aspects of the invention. Rather than returning to step 201 after step 207 in process 200 described above (FIG. 2), in step 401 the process accesses an update alert table associated with the web page url updated in step 207. In step 402 process 400 determines whether there are any update alert recipients associated with the web page url that has been updated. If NO, process 400 ends. If YES, in step 403 process 400 directs a messaging process, such as the e-mail process 104 in FIG. 1, to send an update alert to each of the update alert recipients associated with the web page url in the update alert table. Finally, in step 404 the messaging process sends the update alerts to the update alert recipients. It will be understood that process 400 need not be run immediately after process 200. It will also be understood that process 400 need not be run in conjunction with process 200 at all, but run entirely independent of process 200 with the addition of a step to determine whether any web page urls in the update alert table have been updated.

While the invention has been described in connection with the embodiments depicted in the various figures, it is to be understood that other similar embodiments may be used or modifications and additions may be made to the described embodiments for performing the same function of the invention without deviating therefrom. For example, automatic updating server 100 could be part of web hosting server 105, e-mail process 104 could reside on a server separate from automatic updating server 100, and customer profiles 103 need not reside in memory 102 but could comprise a web page on each named party's web server 105. Moreover, updating process 101 could be built as a client that runs each time a named party boots up his or her personal computer, examines the named party's web site via a resident web browser, and provides pop-up or on-screen reminders when content is due to be updated. Therefore, the invention should not be limited to any single embodiment, but rather construed in breadth and scope in accordance with the appended claims.

What is claimed:

1. A method for providing alerts of an update to web site content, comprising:
   receiving, at an updating server, a plurality of requests from a plurality of visitors of a web site to be notified of an update to the web site content, wherein each request contains a universal resource locator of a web page and multiple addresses to which to send the alerts when the web site content at the universal resource locator is updated;
   transmitting a first message containing a copy of first selected content of the web site content to the plurality of visitors of the web site;
   ignoring, from a visitor of the plurality of visitors, a lack of response to the first message, wherein the lack of response to the first message is ignored based on an option specified in an update profile of the visitor;
   transmitting, after ignoring the lack of response to the first message, a second message to the visitor in accordance with the update profile, wherein the second message is associated with updating second selected content of the web site content;
   receiving, at the updating server and if a response to the first message is received, a revised copy of the first selected content of the web site content, wherein the first selected content is selected based on a sequential update type designated by the visitor;
   receiving, at the updating server, a revised copy of the second selected content of the web site content, wherein the second selected content is selected based on a random update type;
   updating, by the updating server and if the response to the first message is received, the web site content based on the revised copy of the first selected content and the revised copy of the second selected content;
   updating, by the updating server, the website content based on the revised copy of the second selected content;
   updating, by the update server, an update log for the web site in response to updating the web site content;
   after updating the update log for the web site, determining, at the updating server, whether any of the plurality of visitors have requested to be notified of the update to the web site content; and
   sending, from the updating server, an alert message to each of the multiple addresses contained in each of the plurality of requests received from at least a portion of the plurality of visitors to notify each of the at least a portion of the plurality of visitors of the update to the web site content in response to determining that the at least a portion of the plurality of visitors has requested to be notified of the update to the web site content.

2. The method according to claim 1, wherein each request is created in response to one of the plurality of visitors clicking on an element on the web page.

3. The method according to claim 1, further comprising:
   storing the universal resource locator of the web page and the multiple addresses associated with the web page into a first update alert table.

4. The method according to claim 1, further comprising receiving the revised copy of the first selected content in response to the first message containing the copy of the first selected content, wherein the first message indicates that the copy of the first selected content needs to be updated, and further comprising updating the web site content in response to the first message.

5. The method according to claim 1, wherein the update log for the web site is contained in a remarks section of the web site.

6. The method according to claim 5, wherein the update log contains an automatic sequence number field, a last updated date field, and a last updated by field.

7. A non-transitory machine-readable medium, having stored thereon instructions, which, when executed by a processor, cause the processor to perform operations, the operations comprising:
   receiving a plurality of requests from a plurality of visitors of a web site to be notified of an update to web site content, wherein each of the requests contains a universal resource locator of a web page and multiple addresses to which to send alerts when the web site content at the universal resource locator is updated, wherein the requests are received while each of the visitors is viewing the web site content;
   transmitting a first message containing a copy of first selected content of the web site content to the plurality of visitors of the web site;
   ignoring, from a visitor of the plurality of visitors, a lack of response to the first message, wherein the lack of response to the first message is ignored based on an option specified in an update profile of the visitor;

transmitting, after ignoring the lack of response to the first message, a second message to the visitor in accordance with the update profile, wherein the second message is associated with updating second selected content of the web site content;

receiving, if a response to the first message is received, a revised copy of the first selected content of the web site content, wherein the first selected content is selected based on a sequential update type designated by the visitor;

receiving a revised copy of the second selected content of the website content, wherein the second selected content is selected based on a random update type;

updating, if the response to the first message is received, the web site content based on the revised copy of the first selected content and the revised copy of the second selected content;

updating, by the updating server, the website content based on the revised copy of the second selected content;

updating an update log for the web site in response to updating the web site content;

after updating the update log for the web site, determining whether any of the plurality of visitors have requested to be notified of the update to the web site content; and sending an alert message to each of the multiple addresses contained in each of the plurality of requests received from at least a portion of the plurality of visitors to notify each of the at least a portion of the plurality of visitors of the update to the web site content in response to determining that the at least a portion of the plurality of visitors has requested to be notified of the update to the web site content.

8. The non-transitory machine-readable medium according to claim 7, wherein each request is created in response to one of the plurality of visitors clicking on an element on the web page.

9. The non-transitory machine-readable medium according to claim 7, wherein the operations further comprise:
storing the universal resource locator of the web page and the multiple addresses associated with the web page into a first update alert table.

10. The non-transitory machine-readable medium according to claim 7, wherein the operations further comprise receiving the revised copy of the first selected content in response to the first message containing the copy of the first selected content, wherein the first message indicates that the copy of the first selected content needs to be updated.

11. The non-transitory machine-readable medium according to claim 7, wherein the update log for the web site is contained in a remarks section of the web site.

12. The non-transitory machine-readable medium according to claim 11, wherein the update log contains an automatic sequence number field, a last updated date field, and a last updated by field.

13. An apparatus for providing alerts of an update to web site content, comprising:
a memory that stores instructions;
an interface to a web hosting server that hosts a web site having content resident thereon;
an interface; and
a processor that executes the instructions from the memory to perform operations, the operations comprising:
receiving a plurality of requests from a plurality of visitors to be notified of an update to the web site content, wherein each request contains a universal resource locator of a web page and multiple addresses to which to send the alerts when the web site content at the universal resource locator is updated, wherein the requests are received while each of the visitors is viewing the web site content;

transmitting a first message containing a copy of first selected content of the web site content to the plurality of visitors of the web site;

ignoring, from a visitor of the plurality of visitors, a lack of response to the first message, wherein the lack of response to the first message is ignored based on an option specified in an update profile of the visitor;

transmitting, after ignoring the lack of response to the first message, a second message to the visitor in accordance with the update profile, wherein the second message is associated with updating second selected content of the web site content;

receiving, if a response to the first message is received, a revised copy of the first selected content of the web site content, wherein the first selected content is selected based on a sequential update type designated by the visitor;

receiving a revised copy of the second selected content of the web site content, wherein the first selected content is selected based on a random update type;

detecting changes to the web site content;

updating, if the response to the first message is received, the web site content based on the revised copy of the first selected content and the revised copy of the second selected content;

updating, by the updating server, the website content based on the revised copy of the second selected content;

updating an update log for the web site in response to updating the web site content;

after updating the update log for the web site, determining whether any of the plurality of visitors have requested to be notified of the update to the web site content; and sending an alert message to each of the multiple addresses contained in each of the plurality of requests received from at least a portion of the plurality of visitors to notify each of the at least a portion of the plurality of visitors of the update to the web site content.

14. The apparatus of claim 13, wherein the update alerting process module comprises a database of universal resource locators and associated alert addresses.

15. The apparatus of claim 13, wherein the alert message is sent to a wireless device.

16. The apparatus of claim 13, wherein the operations further comprise storing the universal resource locator of the web page and the multiple addresses associated with the web page into a first update alert table.

17. The apparatus of claim 13, wherein the operations further comprise receiving the revised copy of the first selected content in response to the first message containing the copy of the first selected content, wherein the first message indicates that the copy of the first selected content needs to be updated.

18. The apparatus of claim 13, wherein the update log for the web site is contained in a remarks section of a web page associated with the first selected content of the web site.

19. The apparatus of claim 18, wherein the update log contains an automatic sequence number field, a last updated date field, and a last updated by field.

* * * * *